3,330,629
COMPLEX COMPOUNDS OF TRANSITION-METAL CARBONYLS AND THEIR PREPARATION
George W. Parshall, Newark, Del., assignor to E. I. du Pont de Nemours and Company, Wilmington, Del., a corporation of Delaware
No Drawing. Filed Aug. 22, 1962, Ser. No. 218,787
16 Claims. (Cl. 23—361)

This invention relates to a new class of transition-metal complex compounds and their preparation.

In recent years a great variety of new complex compounds of transition-metal carbonyls have been reported. In nearly all these compounds, the bond between each complexed group and the transition-metal atom is considered to involve donation of a pair of electrons by the complexed group, frequently referred to as a ligand, to the transition metal. Since many of these compounds are useful as catalysts for chemical reactions, and since their catalytic properties can be profoundly influenced by changes in the ligands, the discovery of new transition-metal complexes, especially those in which the metals may act as electron donors rather than acceptors, is a desirable goal.

There have now been prepared a new class of complex compounds of transition-metal carbonyls that can be represented by the formula (1)  $M[(X_3B)_nMe(CO)_p]$ where:

M is an alkali metal, a quaternary ammonium group or a quaternary phosphonium group, defined further below;
X is hydrogen or fluorine;
Me is a transition metal of Group VII–B of the Periodic Table, i.e., manganese, technetium, or rhenium, or of the second subgroup of Group VIII, i.e., cobalt, rhodium, or iridium;
$n$ is one or two, being two only when X is hydrogen and Me is of atomic number greater than 28; and
$p$ is four or five, being four when Me is a Group VIII metal and five when Me is a Group VII–B metal.

The Periodic Table referred to is that in Deming's "General Chemistry," Fifth Edition, page 156 (Wiley, 1944).

The products have a saltlike nature and the ionic alternative formulation can be written as follows:

(2)  $M^+[(X_3B)_nMe(CO)_p]^-$ in which the charges on the cation and anion are shown and in which all terms are as defined above.

The products of the invention are prepared by reacting a boron compound of formula $B_mX_{3m}$, where X is hydrogen or fluorine and $m$ is one or two, $m$ being two when X is hydrogen and one when X is fluorine, i.e., diborane ($B_2H_6$) or boron trifluoride ($BF_3$), with a salt of the formula $MMe(CO)_p$, where M, Me, and $p$ are as defined above.

In the products of Formulas 1 and 2, alkali metals are preferred values of M, because products containing them can be made in fewer steps.

Products of the invention in which X is hydrogen are preferred, because the process leading to them is more easily controlled, and because a wider range of such products can be made, since one or two $BH_3$ groups can be introduced for metals of atomic number greater than 28.

Products in which Me is a Group VII–B metal are preferred. Of these, products containing manganese as the transition metal are especially preferred because of their superior catalytic activity (discussed subsequently).

The quaternary ammonium and phosphonium groups that are values of M in Formulas 1 and 2 can be represented by the formulas $R_4N$ and $R'_4P$ wherein the R groups are the same or different and are alkyl of 1–12 carbons or aralkyl of 7–12 carbons, and the R' groups are the same or different and are alkyl of 1–12 carbons, aryl of 6–12 carbons, or aralkyl or alkaryl of 7–12 carbons. Examples are tetramethylammonium, dodecyltrimethylammonium, tetraisopentylammonium, benzyltrimethylammonium, tetrahexylammonium, tetrapropylammonium, tribenzylmethylammonium, tributyldodecylammonium, trimethyl(3-phenylpropyl)ammonium, trimethyl(α-naphthylmethyl) ammonium, didodecyldiethylammonium, heptylhexylmethylpropylammonium, tetramethylphosphonium, tetraethylphosphonium, tetraisopropylphosphonium, tetra(α-naphthyl)phosphonium, benzyltri(4-biphenylyl)phosphonium, tetrabenzylphosphonium, benzyltrimethylphosphonium, ethyltriphenylphosphonium, ethyldiphenylpropylphosphonium, dodecyltriethylphosphonium, tetraisopentylphosphonium, trimethyl(2,4,6-trimethylphenyl) phosphonium, isobutylethylmethylisopropylphosphonium, and 4-ethylphenylmethyldipentylphosphonium. For reasons of availability, a preferred class of quaternary ammonium and phosphonium cations are those in which all the R's are the same and are alkyl of 1–7 carbons or aralkyl of 7 carbons.

PREPARATION OF STARTING MATERIALS

The compounds $MMe(CO)_p$ in which M is an alkali metal are readily made by reacting an alkali metal, either free or as an amalgam, with a carbonyl of the metal Me, usually in an ether such as tetrahydrofuran or 1,2-dimethoxyethane. This reaction is well known and is described, for example, by Hieber and Wagner, Z. Naturforsch., 13b, 339 (1958); Hieber and Braun, Z. Naturforsch., 14b, 132 (1959); and McClellan, J. Am. Chem. Soc. 83, 1598 (1961). The preparation is conveniently carried out in the reactor to be used for the process of the invention, and the solution of the alkali-metal salt thus formed can be used directly, following removal of mercury if an amalgam is used.

The corresponding quaternary ammonium and phosphonium salts, $R_4NMe(CO)_p$ and $R'_4PMe(CO)_p$, are made by allowing a solution of an alkali-metal salt, prepared as described above, to react with a solution of an equivalent amount of a quaternary ammonium or phosphonium halide, preferably a chloride or bromide. Suitable solvents are the ethers exemplified above and nitriles such as acetonitrile and propionitrile. The preparation is conveniently carried out at room temperature. The course of the reaction can be followed by watching the rate of precipitation of alkali-metal halide. The solution of the product is separated by filtration or decantation and used directly in the process of the invention.

PROCESS OF THE INVENTION

The process is most conveniently carried out in the presence of a mutual, inert solvent or diluent for the reactants. Ethers such as those used for the preparation of the starting material $MMe(CO)_p$ are preferred. Examples are tetrahydrofuran, 1,2-dimethoxyethane, di(2-methoxyethyl) ether, and di(2-ethoxyethyl) ether. Inert hydrocarbons, e.g., benzene, toluene, cyclohexane, heptane, and methylcyclohexane, can also be used. Halohydrocarbons such as dichloromethane can be used but are less preferred since they may react with the intermediate alkali-metal salts, $MMe(CO)_p$, at ordinary temperatures or higher.

In preparing products in which only one boron moiety per transition metal atom can be introduced, i.e., when $BF_3$ is a reactant or the transition metal ME is of atomic number less than 28 any ratio of reactants can be used. For efficient operation, a moderate molar excess (10-100%) of the boron compound is used in order to insure complete consumption of the other reactant. With diborane as the boron reactant and transition metals of atomic number greater than 28, i.e., when either one or two $BH_3$ groups can be introduced, the mole ratio will depend on the number of such groups desired. For introducing one $BH_3$ group per transition metal atom, approximately equal amounts of reactants are used; for two such groups, a moderate excess as disclosed above is best used. When either one or two $BH_3$ groups can be introduced, both types of products may be formed in the same process. They can be separated by differences in solubility.

The temperature can vary considerably, and will depend in part on whether a $BH_3$ group or a $BF_3$ group is being introduced. For introducing $BH_3$ groups (reaction of diborane), temperatures from about $-50°$ C. to $50°$ C. can be used. Below about $-50°$ C. the rate is too slow for practical purposes; above about $50°$ C. the rate of decomposition of some of the products becomes a significant factor. Preferred temperatures are $0$–$35°$ C. For convenience, ordinary temperatures ($20$–$30°$ C.) are usually employed. Introduction of a $BF_3$ group by reaction with boron trifluoride can be carried out at temperatures from about $-130°$ C. to $50°$ C., the preferred range being between $-85°$ C. and $30°$ C. An especially convenient temperature is approximately $-78°$ C., the temperature obtained by cooling with excess solid carbon dioxide.

The process can be carried out at subatmospheric, atmospheric, or superatmospheric pressure. The most convenient, and therefore the preferred, pressure is about atmospheric pressure or slightly below. When diborane is a reactant, the drop in total pressure of the system as the reactants combine furnishes a convenient method of following the progress of the reaction. Another way of determining when the reaction, which is slightly exothermic, is complete is to note when there is no longer any tendency for the mixture to warm up. Still another sign of reaction, especially with $BF_3$, is the change of color that frequently occurs as reaction proceeds. The time required will depend on the reactants and the temperature and can be as short as a few minutes or as long as about 24 hours. The reaction is usually essentially complete in 1–6 hours, and this therefore constitutes the preferred time range. At the completion of the reaction the product, when isolable, is isolated by evaporation of the solvent or by precipitation with a nonsolvent, such as ethyl ether, followed by filtration.

Because many of the compounds involved are sensitive to air and moisture, the process is best carried out in apparatus in which operations such as filtration, evaporation, and crystallization can be performed without exposure to the atmosphere.

PROPERTIES OF THE PRODUCTS

The products of this invention, when isolated from solution, are crystalline solids. They react with oxygen and moisture and should therefore be stored out of contact with air. They are soluble in ethers such as tetrahydrofuran and 1,2-dimethoxyethane and in nitriles such as acetonitrile. Their infrared and n-m-r spectra are reconcilable with the fact that the bonds between boron and transition-metal atoms in the compounds involve donation of a pair of electrons from the metal to the boron. This type of bonding also is to be expected from the known acceptor properties of boron.

Some of the products cannot be isolated from solution at ordinary temperatures without decomposition. This relative instability, which involves the breaking of boron-transition-metal bonds, is actually an advantage in one of the important uses of the products, namely, the catalysis of certain reactions of diborane and boron trifluoride. Catalytic activity in this application parallels the ease with which bonds between boron and the transition metal are made and broken.

The following examples illustrate the products and process of this invention.

Example 1

The entire process was carried out in an atmosphere free of oxygen and water. A solution of 2.5 g. of dirhenium decacarbonyl, $Re_2(CO)_{10}$, in 25 ml. of tetrahydrofuran was mixed with 23 g. of 1% sodium amalgam, and the mixture was stirred at room temperature until the reaction was complete, as evidenced by disappearance of the absorption band at $4.94\mu$ (characteristic of $Re_2(CO)_{10}$) in the infrared spectrum of the solution. About three hours were required for completion. The mixture was filtered through a fine-porosity sintered glass filter to remove the mercury. The filtrate was a deep-red solution of $NaRe(CO)_5$. The solvent was evaporated from this solution under reduced pressure, and the residual salt was dissolved in 12 ml. of di(2-methoxyethyl) ether. The reactor and its contents were cooled to $-196°$ C., the reactor was evacuated, and 0.38 g. of diborane was added to the system. The mixture was allowed to warm to room temperature and was held at this temperature with stirring until reaction was complete, as indicated by the absence of any further pressure drop. The reaction with diborane required about two hours at room temperature. Unreacted diborane was removed under reduced pressure, and the solution was filtered to remove traces of insoluble material. Evaporation of the solvent under reduced pressure, followed by drying at $77°$ C./$10^{-3}$ mm. for eight hours, gave $$Na[(H_3B)_2Re(CO)_5]$$

as an orange, crystalline solid. Analysis showed that the salt was obtained as a solvate containing 1.5 moles of di(2-methoxyethyl) ether per mole of salt.

*Analysis.*—calcd. for $C_{14}H_{27}B_2NaO_{9.5}Re$: C, 29.1; H, 4.72; B, 3.74; Re, 32.2. Found: C, 26.0; H, 4.02; B, 3.29; Re, 33.13.

If ditechnetium decarbonyl, $Tc_2(CO)_{10}$, is substituted for $Re_2(CO)_{10}$ in the process of Example 1, the salts $Na[H_3BTc(CO)_5]$ and $Na[(H_3B)_2Tc(CO)_5]$ can be formed. Formation of the former is favored by using equivalent amounts of $NaTc(CO)_5$ and diborane; the latter predominates when an excess of diborane is used.

Example 2

$Na[(H_3B)_2Re(CO)_5]$ was prepared essentially by the procedure of Example 1, except that the tetrahydrofuran was used as the solvent for the reaction with diborane and was not replaced by di(2-methoxyethyl) ether. The $B^{11}$ magnetic-resonance spectrum of the product (tetrahydrofuran solution; measured at 14.2 mc./sec.) had a single featureless peak at 300 c.p.s. on the high-field side of the methyl borate reference signal.

Example 3

A solution of $NaCo(CO)_4$ in tetrahydrofuran was prepared as in Example 1 from 3.0 g. of dicobalt octacarbonyl $[Co_2(CO)_8]$, 46 g. of 1% sodium amalgam, and 12 ml. of tetrahydrofuran. The solution was separated from the mercury by decantation (with a syringe), and the tetrahydrofuran was replaced with 11 ml. of di(2-methoxyethyl) ether as in Example 1. Diborane (0.28 g.) was added by the method of Example 1, and the mixture was stirred at room temperature for 16 hours. The drop in pressure, which corresponded to consumption of one equivalent of diborane per equivalent of $NaCo(CO)_4$, showed that $Na[H_3BCo(CO)_4]$ was formed in solution.

The salts $Cs[H_3BRh(CO)_4]$ and $Cs[(H_3B)_2Rh(CO)_4]$ can be formed by substituting dirhodium octacarbonyl and cesium amalgam for the $Co_2(CO)_8$ and sodium amalgam in Example 3. The salt $CsRh(CO)_4$ is formed as an intermediate. Using an equivalent amount or less of diborane favors formation of the product containing one $BH_3$ group, while an excess of diborane favors formation of that containing two $BH_3$ groups.

Example 4

A solution of NaMn(CO)$_5$ in tetrahydrofuran was prepared by the method of Example 1 from 1.95 g. of dimanganese decacarbonyl [Mn$_2$(CO)$_{10}$], 23 ml. of 1.4% sodium amalgam, and 20 ml. of tetrahydrofuran. The yellow-green solution was decanted from the mercury, and to it, by the method of Example 1, was added 0.28 g. of diborane. The solution was stirred at room temperature for two hours. The drop in pressure, which corresponded to consumption of about one equivalent of diborane per equivalent of NaMn(CO)$_5$, showed that Na[H$_3$BMn(CO)$_5$] had been formed in solution.

Example 5

Diborane was allowed to react for one hour at room temperature with a solution of 0.095 g. of LiMn(CO)$_5$ in 1 ml. of tetrahydrofuran. This solution was part of a larger one prepared by the reaction of lithium wire with Mn$_2$(CO)$_{10}$ in tetrahydrofuran (cf. McClellan, J. Am. Chem. Soc., 83, 1598 (1961)). Li[H$_3$BMn(CO)$_5$] was formed in solution. The reactor containing the solution was evacuated to 10$^{-4}$ mm. at −78° C., after which the Mn$^{55}$ magnetic-resonance spectrum of the solution consisted of a single broad line at +22.7 gauss to the high-field side of the KMnO$_4$ reference signal.

Example 6

Liquid cesium amalgam was formed by adding 1.0 g. of cesium metal dropwise to 31 g. of mercury with stirring. The amalgam was cooled to 0° C., and 1.30 g. of Re$_2$(CO)$_{10}$ and 10 ml. of tetrahydrofuran were added. The mixture was stirred at 0° C. for one hour and allowed to warm to room temperature. The deep-red-orange solution of CsRe(CO)$_5$ thus produced was decanted from the mercury, and to it was added, by the method of Example 1, 0.14 g. of diborane. The mixture was stirred at room temperature for two hours, after which excess diborane and tetrahydrofuran were evaporated under reduced pressure. Dioxane (8 ml.) was added to the residual material to induce crystallization. After standing overnight, the dioxane solution that formed initially had deposited golden-yellow crystals of Cs[(H$_3$B)$_2$Re(CO)$_5$]

which were separated by filtration and dried at 25° at 10$^{-4}$ mm. for four hours. Analysis showed that the product was obtained as a solvate containing one-half mole of dioxane per mole of salt.

*Analysis.*—Calcd. for C$_7$H$_{10}$B$_2$CsO$_6$Re: C, 15.9; H, 1.90; B, 4.07; Cs, 25.1. Found: C, 16.89; H, 2.42; B, 3.70; Cs, 24.8.

Example 7

NaRe(CO)$_5$ was prepared by the procedure of Example 1 from 2.17 g. of Re$_2$(CO)$_{10}$ and 23 g. of 1.4% sodium amalgam in 13 ml. of tetrahydrofuran. A solution of 2.25 g. of tetrabutylphosphonium bromide in 4 ml. of tetrahydrofuran was added, whereupon a reaction occurred immediately at room temperature, as shown by the formation of a precipitate of sodium bromide. The latter was removed by filtration. The solution of (C$_4$H$_9$)$_4$PRe(CO)$_5$ thus obtained was cooled to −196° C., 0.20 g. of diborane was added, and the mixture was allowed to warm to room temperature. The mixture was stirred at room temperature until reaction between the diborane and the tetrabutylphosphonium salt was complete, as shown by the absence of any further pressure drop. This reaction required about two hours. Tetrahydrofuran and excess diborane were evaporated under reduced pressure, and the residual red solid was washed with ethyl ether and recrystallized twice from a mixture of tetrahydrofuran and ethyl ether.

(C$_4$H$_9$)$_4$P[(H$_3$B)$_2$Re(CO)$_5$]

was thus obtained as a red-orange, crystalline solid, soluble in tetrahydrofuran and slightly soluble in ethyl ether.

*Analysis.*—Calcd. for C$_{21}$H$_{42}$B$_2$O$_5$PRe: C, 41.1; H, 6.92; B, 3.54; P, 5.05; Re, 30.3. Found: C, 40.08, 39.78; H, 6.48, 6.69; B, 4.33, 4.27; P, 4.97, 4.67; Re, 33.4.

The infrared absorption spectrum of the product (mineral-oil mull) had strong absorption at 4.2μ (B–H) and very strong absorption centered at 5.15μ (metal-CO).

Example 8

A solution of NaRe(CO)$_5$ in tetrahydrofuran was prepared by the method of Example 7. A 2-ml. portion of the solution was removed for another use, and the remainder was added to 0.85 g. of tetraethylammonium chloride. The mixture was stirred at room temperature for 16 hours and filtered to remove sodium chloride. To the solution of (C$_2$H$_5$)$_4$NRe(CO)$_5$ thus obtained was added 0.14 g. of diborane by the method of Example 1, and the mixture was stirred at room temperature for five hours. Excess diborane and tetrahydrofuran were evaporated under reduced pressure. Dichloromethane (5 ml.) was added to the residue, and the mixture was warmed to 30° C. to give a solution. On cooling to 0° C., orange crystals of (C$_2$H$_5$)$_4$N[(H$_3$B)$_2$Re(CO)$_5$] separated and were isolated by filtration and dried at 25° C./0.1 mm.

*Analysis.*—Calcd. for C$_{13}$H$_{26}$B$_2$NO$_5$Re: C, 32.2; H, 5.41; B, 4.46. Found: C, 27.92; H, 4.63; B, 5.78.

When the filtrate was chilled to −78° C., orange crystals of (C$_2$H$_5$)$_4$N[H$_3$BRe(CO)$_5$] separated and were isolated by filtration and recrystallized from dichloromethane.

*Analysis.*—Calcd. for C$_{13}$H$_{23}$BNO$_5$Re: C, 33.19; H, 4.93; B, 2.30; Re, 39.59. Found: C, 30.10; H, 4.36; B, 2.68; Re, 40.0.

The infrared spectrum (mineral-oil mull) showed absorption at 4.2μ (B–H) and 4.95–5.3μ (metal-CO).

The salts (i-C$_4$H$_9$)$_4$N[H$_3$BTc(CO)$_5$] and (i-C$_4$H$_9$)$_4$N[(H$_3$B)$_2$Tc(CO)$_5$]

can be made by the process of Example 8 if NaTc(CO)$_5$ (made from Tc$_2$(CO)$_{10}$ and sodium amalgam) is substituted for NaRe(CO)$_5$ and tetraisobutylammonium chloride is substituted for tetraethylammonium chloride. Using an equivalent or less of diborane per equivalent of NaTc(CO)$_5$ favors formation of the mono-BH$_3$ compound, while an excess of diborane favors the formation of the product containing two BH$_3$ groups.

Similarly, substitution of NaIr(CO)$_4$ (from diiridium octacarbonyl (Ir$_2$(CO)$_8$) and sodium amalgam) for NaRe(CO)$_5$ and of tetraisopropylphosphonium bromide for tetraethylammonium chloride in Example 8 can provide the products (i-C$_3$H$_7$)$_4$N[H$_3$BIr(CO)$_4$] and (i-C$_3$H$_7$)$_4$N[(H$_3$B)$_2$Ir(CO)$_4$].

Example 9

A solution of NaMn(CO)$_5$ was prepared by the method of Example 4 from 1.37 g. of Mn$_2$(CO)$_{10}$, 25 g. of 1.4% sodium amalgam, and 14 ml. of tetrahydrofuran. The solution was combined at room temperature with a solution of 1.16 g. of tetraethylammonium chloride in 7 ml. of acetonitrile. Reaction occurred immediately, as shown by precipitation of sodium chloride. The solvents were evaporated under reduced pressure and 10 ml. of tetrahydrofuran was added. The mixture was filtered to remove sodium chloride, and to the green solution of (C$_2$H$_5$)$_4$NMn(CO)$_5$ was added, by the method of Example 1, 0.28 g. of diborane. The mixture was held at room temperature for about two hours. Addition of 12 ml. of ethyl ether and cooling of the mixture to −78° C. did not give a precipitate. The solution was evaporated to dryness under reduced pressure, 3 ml. of tetrahydrofuran and 0.20 g. of diborane were added, and the mixture was held at room temperature for one hour. Ethyl ether (7 ml.) was added, and the mixture was cooled to −78° C. The higher ethyl ether/tetrahydrofuran ratio and the lower absolute amount of tetrahydrofuran in this mixture, compared with the one described above, caused the precipitation of fine yellow crystals of $(C_2H_5)_4N[H_3BMn(CO)_5]$, which were separated by filtration and dried under reduced pressure.

*Analysis.*—Calcd. for $C_{13}H_{23}BMnNO_5$: C, 46.05; H, 6.84; Mn, 16.20. Found: C, 46.78; H, 6.74; Mn, 14.04.

The infrared absorption spectrum of the product (mineral-oil mull) showed absorption at $4.2\mu$ (B–H) and strong broad absorption at $5.4\mu$ (metal-CO).

If tetrabenzylphosphonium chloride is substituted for tetraethylammonium chloride and $NaCo(CO)_4$ for $NaMn(CO)_5$ in Example 9, the product $$(C_6H_5CH_2)_4P[H_3BCo(CO)_4]$$

can be made. Correspondingly, methyltriphenylphosphonium chloride and $NaCo(CO)_4$ in the same process give the product $CH_3(C_6H_5)_3P[H_3BCo(CO)_4]$.

Example 10

A solution of $NaRe(CO)_5$ was prepared by the method of Example 1 from 2.17 g. of $Re_2(CO)_{10}$, 25 g. of 1.4% sodium amalgam, and 13 ml. of tetrahydrofuran. $(C_2H_5)_4NRe(CO)_5$ was formed from the sodium salt by the method of Example 9. The solvents were evaporated under reduced pressure, the residual solid was cooled to $-78°$ C., the reactor was evacuated, and 10 ml. of dichloromethane and 0.68 g. of $BF_3$ were added. The mixture was allowed to warm to $0°$ C., at about which temperature the orange solid dissolved and the double salt $$(C_2H_5)_4N[F_3BRe(CO)_5] \cdot (C_2H_5)_4NBF_4$$

precipitated as a yellow crystalline solid. The latter was separated by filtration, washed with dichloromethane, and dried under reduced pressure.

*Analysis.*—Calcd. for $C_{21}H_{40}B_2F_7NO_5Re$: C, 34.5; H, 5.81; B, 2.92; F, 20.6. Found: C, 33.20; H, 6.34; B, 3.82; F, 15.29.

The infrared absorption spectrum of the product showed three sharp bands of $4.86\mu$, $4.93\mu$, and $5.03\mu$ (metal-CO).

The product was also prepared by a modification of the above process, in which tetrahydrofuran was used as the reaction medium, the temperature range was $-196°$ C. to $25°$ C., and benzene was used for washing the crystalline product.

*Analysis.*—Found: C, 35.54; H, 6.33; B, 4.17; F, 20.13.

The product $C_{12}H_{25}(CH_3)_3N[F_3BRe(CO)_5]$ can be made by essentially the process of Example 10 of dodecyltrimethylammonium bromide if substituted for the tetraethylammonium chloride.

Example 11

A solution of $NaCo(CO)_4$ was prepared by the method of Example 3 from 1.4 g. of $Co_2(CO)_8$, 25 g. of 1.4% sodium amalgam, and 16 ml. of tetrahydrofuran. The corresponding tetraethylammonium salt, $$(C_2H_5)_4NCo(CO)_4$$

was prepared from the sodium salt by the method of Example 9. After removal of sodium chloride, the solvents were evaporated under reduced pressure, and the solid was redissolved in 10 ml. of tetrahydrofuran. One milliliter of the solution was removed for another use. The remainder of the solution was cooled to $-78°$ C., 0.88 g. of $BF_3$ was added, and the mixture was held at $-78°$ C. for two hours and then at room temperature for 15 minutes. The mixture became red almost immediately after the $BF_3$ was added, indicating a rapid reaction at $-78°$ C. Excess $BF_3$ and solvent were evaporated under reduced pressure. The residue was extracted with 2 ml. of tetrahydrofuran, leaving $(C_2H_5)_4N[F_3BCo(CO)_4]$ as a dark-brown solid, which was dried at $25°$ C./$10^{-4}$ mm.

*Analysis.*—Calcd. for $C_{12}H_{20}BCoF_3NO_4$: C, 39.1; H, 5.47. Found: C, 38.47; H, 5.86.

The infrared absorption spectrum of the product (mineral-oil mull) showed strong absorption at $4.75\mu$ and a doublet at $5.3\mu$ (metal-CO) and strong absorption at $9.54\mu$ (B-F).

Other products of the invention can be prepared by using other reactants in essentially the process of Example 11.

For example, if $KCo(CO)_4$ is substituted for $$NaCo(CO)_4$$

and the metathesis with tetraethylammonium chloride is omitted, the product is $K[F_3BCo(CO)_4]$. Similarly, if $RbMn(CO)_5$ is substituted for $NaCo(CO)_4$ and the replacement of the cation with tetraethylammonium chloride is omitted, the product is $Rb[F_3BMn(CO)_5]$. If $LiIr(CO)_4$ is substituted for $NaCo(CO)_4$ and the reaction with tetraethylammonium chloride is once again omitted, the product $Li[F_3BIr(CO)_4]$ can be prepared.

In addition, the product $$C_6H_5CH_2(CH_3)_3N[F_3BMn(CO)_5]$$

can be produced by replacing the $NaCo(CO)_4$ and tetraethylammonium chloride of Example 11 with $$NaMn(CO)_5$$

and benzyltrimethylammonium chloride. If $NaRh(CO)_4$ and tetrahexylammonium bromide are used in place of the $NaCo(CO)_4$ and tetraethylammonium chloride, the product $(C_6H_{13})_4N[F_3BRh(CO)_4]$ can be formed.

The products of this invention have the important and useful property of catalyzing the formation of polyhydropolyborate anions containing three or more boron atoms from sodium tetrahydroborate ($NaBH_4$) and either diborane at atmospheric pressure or, more importantly, boron trifluoride. The ability to prepare polyhydropolyborate anions from diborane at atmospheric pressure, or without using diborane at all, i.e., from boron trifluoride instead, is a valuable advance in the art of producing boron-hydrogen compounds. The tetrahydroborates of other alkali metals and of alkaline-earth metals can also be used in this process. The formation of polyhydropolyborates from these salts and diborane at superatmospheric pressures is described in U.S. 3,169,045.

The products of the present invention need not be isolated beforehand for use as catalysts in the synthesis of polyhydropolyborates, but can be used in solutions prepared by the procedures of the foregoing examples. Moreover, they need not even be formed in solution in advance, but can be formed in place during the polyhydropolyborate synthesis if desired. The following examples are illustrative.

Example A

A fragile glass ampoule was charged with a solution of 8.1 g. of boron trifluoride in 32 g. of di(2-methoxyethyl) ether and a solution of 0.2 g. of $(C_4H_9)_4P[H_3BMn(CO)_5]$ in 2 ml. of tetrahydrofuran, prepared essentially by the procedure of Example 9, tetrabutylphosphonium bromide being substituted for tetraethylammonium chloride. The ampoule was sealed and placed in a 240-ml., stainless-steel shaker tube together with 6.0 g. of sodium tetrahydroborate. The tube was sealed, shaken at room temperature for one hour, heated at $150°$ C. with shaking for eight hours, cooled, and opened. The ampoule broke, and its contents were released to the reaction mixture, as soon as shaking was started. The reaction mixture was filtered to remove insoluble material, and the deep-fed filtrate was evaporated to give a purple-red oil. Dilution of the oil with di(2-methoxyethyl) ether gave a white crystalline solid, which was a solvate of sodium dodecahydrododecaborane, $Na_2B_{12}H_{12}$, with di(2-methoxyethyl) ether. The yield was 36% based on the reaction:

$$19NaBH_4 + 20BF_3 \rightarrow 2Na_2B_{12}H_{12} + 15NaBF_4 + 26H_2$$

When the process of Example A was repeated essentially with $Na[F_3BRe(CO)_5]$ as catalyst in place of $$(C_4H_9)_4P[H_3BMn(CO)_5]$$

$Na_2B_{12}H_{12}$ was formed in 15% yield.

When the process of Example A was repeated, but at room temperature with Li[F₃BMn(CO)₅] as catalyst, NaB₃H₈·3 dioxane was obtained in 48% yield on diluting the filtrate from the reaction mixture with dioxane.

*Example B*

An 80-ml., stainless-steel shaker tube was charged with 3.0 g. of sodium tetrahydroborate, 0.2 g. of LiMn(CO)₅ dissolved in 20 ml. of di(2-methoxyethyl) ether, and 5.5 g. of boron trifluoride. The tube was shaken at room temperature for one hour and then at 150° C. for eight hours, cooled, and opened. The reaction product was a mixture of a white solid and a red liquid. The solid was extracted with tetrahydrofuran, and the extract was diluted with 1,2-dimethoxyethane. A white, crystalline solvate of Na₂B₁₂H₁₂ with 1,2-dimethoxyethane precipitated, and was separated by filtration. Its infrared spectrum was identical with that of an authentic sample.

The red solution was diluted with water, and aqueous tetramethylammonium chloride was added, whereupon an off-white solid precipitated. It was separated by filtration and recrystallized from water to give tetramethylammonium dodecahydrododecaborate, [(CH₃)₄N]₂B₁₂H₁₂, identified by its infrared spectrum and elemental analysis.

The total yield of B₁₂H₁₂= as sodium and tetramethylammonium salts was 60%.

When the procedure of Example B was repeated in the absence of LiMn(CO)₅, no B₁₂H₁₂= was formed.

*Example C*

A reactor was charged with 0.38 g. of sodium tetrahydroborate and 10 ml. of di(2-methoxyethyl) ether. A total of 0.53 g. of diborane was added to the system in three portions, and the mixture was allowed to stand at room temperature for 15 hours. No hydrogen was evolved. There was some drop in pressure, corresponding to the formation of NaB₂H₇. Tests on other mixtures similarly prepared showed that no higher polyhydropolyborates were formed by this process. A solution of 0.0095 g. of LiMn(CO)₅ in 0.1 ml. of tetrahydrofuran was added, and the mixture was stirred for about 15 hours at room temperature. Evolution of hydrogen was observed soon after the addition of the LiMn(CO)₅. The mixture was cooled to −196° C., and volatile material, essentially hydrogen, was pumped off. The mixture was allowed to warm to room temperature and stirred for 20 hours more at room temperature. Unreacted diborane wah distilled from the mixture; the amount recovered showed that one mole of diborane per mole of NaBH₄ charged had reacted. The solvent was evaporated under reduced pressure, and the residual, wet solid was mixed with tetrahydrofuran. The mixture was filtered to give a clear solution. When this solution was diluted with dioxane, an off-white, crystalline solid precipitated and was separated by filtration. This product was NaB₃H₈·3 dioxane, identified by its infrared spectrum and by elemental analysis. The yield was 30% based on sodium tetrahydroborate.

The polyhydropolyborate salts exemplified by the products of the foregoing three experiments are known compounds. See, for example, the above-mentioned Ser. No. 30,442; Hough et al., J. Am. Chem. Soc., 80, 1828 (1958); and Muetterties, Merrifield, Miller, Knoth, and Downing, J. Am. Chem. Soc., 84, 2506 (1962).

Because of their sensitivity to water, the products of this invention are also useful as drying agents. For example, when (C₂H₅)₄N[H₃BMn(CO)₅] was dissolved in commercial tetrahydrofuran, hydrogen was evolved. After evolution of the gas had ceased, the infrared spectrum of the solution showed little or no absorption in the 2.7–3.0μ region corresponding to hydroxyl groups. A sample of the tetrahydrofuran before treatment with the tetraethylammonium salt showed appreciable absorption at 2.8μ, due to the presence of water.

The products of the invention in which X is hydrogen are useful as selective reducing agents. For example, approximately 5% solution of Cs[(H₃B)₂Re(CO)₅] in tetrahydrofuran reacted with an approximately 20% solution of Li₂PdCl₄ in ethyl alcohol to give a black precipitate of palladium metal. By contrast, a similar solution did not reduce mercuric acetate in aqueous solution, which result is unexpected in view of the palladium reduction.

Other examples of this selective reducing action are the following: When a 10% solution of

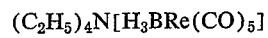
(C₂H₅)₄N[H₃BRe(CO)₅]

in tetrahydrofuran was added to a clear, orange solution of 10% chloranil (tetrachloro-p-benzoquinone) in tetrahydrofuran, the orange color changed to red, and the characteristic C=O absorption of the chloranil at 5.88μ disappeared. When the experiment was repeated with acetone in place of chloranil, the C=O absorption of the acetone at 5.8μ remained unchanged. These results show that (C₂H₅)₄N[H₃BRe(CO)₅ reduced chloranil but not acetone. (C₂H₅)₄N[H₃B)₂Re(CO)₅] and

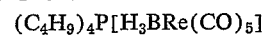
(C₄H₉)₄P[H₃BRe(CO)₅]

behaved similarly. The latter product, in addition, did not reduce benzaldehyde.

Products of the invention in which X is fluorine are useful as catalysts for organic reactions, especially polymerizations, that are catalyzed by Lewis acids. For example, when 0.1 g. of (C₂H₅)₄N[F₃BCo(CO)₄] was mixed with about 0.9 g. of vinyl 2-methoxyethyl ether at ordinary temperature, the liquid warmed spontaneously to about 35° C. and over a period of two hours become quite viscous, which behavior showed that the ether had been polymerized to poly(vinyl 2-methoxyethyl ether).

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A compound of the formula

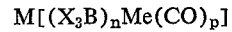
M[(X₃B)ₙMe(CO)ₚ]

wherein

M is selected from the class consisting of
alkali metal,
R₄N wherein R is selected from the class consisting of alkyl of 1 through 12 carbon atoms, aralkyl of 7 through 12 carbon atoms, and
R′₄P wherein R′ is selected from the class consisting of alkyl groups of 1 through 12 carbon atoms, aralkyl groups of 7 through 12 carbon atoms, aryl groups of 6 through 12 carbon atoms, and alkaryl groups of 7 through 12 carbon atoms;

X is selected from the class consisting of
hydrogen, and
fluorine;

Me is a metal selected from the class consisting of
Group VII–B, and
the second subgroup of Group VIII of the Periodic Table;

n is a whole number of from 1 to 2, inclusive, being 2 only when X is hydrogen and Me is of atomic number greater than 28; and p is a whole number of from 4 to 5, inclusive, being 5 when Me is a Group VII–B metal and being 4 when Me is said Group VIII metal.

2. A compound of the formula

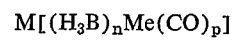
M[(H₃B)ₙMe(CO)ₚ]

wherein

M is a cation selected from the class consisting of
alkali metal,

R₄N wherein R is selected from the class consisting of alkyl of 1 through 12 carbon atoms, aralkyl of 7 through 12 carbon atoms, and R′₄P wherein R′ is selected from the class consisting of alkyl groups of 1 through 12 carbon atoms, aralkyl groups of 7 through 12 carbon atoms, aryl groups of 6 through 12 carbon atoms, and alkaryl groups of 7 through 12 carbon atoms;

Me is a metal selected from the class consisting of
manganese,
technetium,
rhenium,
cobalt,
rhodium, and
iridium;

$n$ is a whole number of from 1 to 2, inclusive, being 2 only when Me is of atomic number greater than 28; and $p$ is a whole number of from 4 to 5, inclusive, being 4 when Me is selected from the group consisting of cobalt, rhodium, and iridium, and being 5 when Me is selected from the group consisting of manganese, technetium, and rhenium.

3. A compound of the formula $$M[F_3BMe(CO)_p]$$

wherein

M is a cation selected from the class consisting of alkali metal,

R₄N wherein R is selected from the class consisting of alkyl of 1 through 12 carbon atoms, aralkyl of 7 through 12 carbon atoms, and R′₄P wherein R′ is selected from the class consisting of alkyl groups of 1 through 12 carbon atoms, aralkyl groups of 7 through 12 carbon atoms, aryl groups of 6 through 12 carbon atoms, and alkaryl groups of 7 through 12 carbon atoms;

Me is a metal selected from the class consisting of Group VII–B, and
the second subgroup of Group VIII of the Periodic Table;

and $p$ is a whole number of from 4 to 5, inclusive, being 5 when Me is a Group VII–B metal and being 4 when Me is said Group VIII metal.

4. A compound of the formula $$M[(X_3B)_nMe(CO)_p]$$

wherein

M is an alkali metal cation; X is selected from the class consisting of
hydrogen, and
fluorine;

Me is a metal selected from the class consisting of Group VII–B, and
the second subgroup of Group VIII of the Periodic Table;

$n$ is a whole number of from 1 to 2, inclusive, being 2 only when X is hydrogen and Me is of atomic number greater than 28; and $p$ is a whole number of from 4 to 5, inclusive, being 5 when Me is a Group VII–B metal and being 4 when Me is said Group VIII metal.

5. A compound of the formula $$M[X_3BMn(CO)_5]$$

wherein

M is a cation selected from the class consisting of alkali metal,

R₄N wherein R is selected from the class consisting of alkyl of 1 through 12 carbon atoms, aralkyl of 7 through 12 carbon atoms, and R′₄P wherein R′ is selected from the class consisting of alkyl of 1 through 12 carbon atoms, aralkyl of 7 through 12 carbon atoms, aryl of 6 through 12 carbon atoms, and alkaryl of 7 through 12 carbon atoms; and X is selected from the class consisting of
hydrogen, and
fluorine.

6. A compound of the formula $$M[(H_3B)_nMe(CO)_5]$$

wherein M is an alkali metal cation, Me is a Group VII–B metal, and $n$ is a whole number of from 1 to 2, inclusive, being 2 only when Me is of atomic number greater than 28.

7. A compound of the formula $$M[(H_3B)Mn(CO)_5]$$

wherein M is an alkali metal cation.

8. $Na[(H_3B)_2Re(CO)_5]$.
9. $Na[H_3BMn(CO)_5]$.
10. $(C_4H_9)_4P[(H_3B)_2Re(CO)_5]$.
11. $(C_2H_5)_4N[H_3BMn(CO)_5]$.
12. $(C_2H_5)_4N[F_3BCo(CO)_4]$.

13. Process for preparing borane complexes with transition metal carbonyls which comprises reacting a boron compound selected from the class consisting of $B_2H_6$, and $BF_3$ with a compound of the formula $MMe(CO)_p$ wherein M is a cation selected from the class consisting of alkali metal, R₄N wherein R is selected from the class consisting of alkyl of 1 through 12 carbon atoms, aralkyl of 7 through 12 carbon atoms, and R′₄P wherein R′ is selected from the class consisting of alkyl of 1 through 12 carbon atoms, aralkyl of 7 through 12 carbon atoms, aryl of 6 through 12 carbon atoms, and alkaryl of 7 through 12 carbon atoms;

Me is a metal selected from the class consisting of Group VII–B, and
the second subgroup of Group VIII of the Periodic Table; and $p$ is a whole number of from 4 to 5, inclusive, being 5 when Me is a Group VII–B metal and being 4 when Me is said Group VIII metal.

14. Process of claim 13 wherein the reaction is carried out at a temperature of between −130° C. to 50° C. in an inert atmosphere.

15. Process of claim 13 wherein the boron compound is $B_2H_6$ and wherein the reaction is carried out at a temperature range of between −50° C. to 50° C. in an inert atmosphere.

16. Process of claim 13 wherein the boron compound is $BF_3$ and wherein the reaction is carried out at a temperature range of between −130° C. to 50° C. in an inert atmosphere.

References Cited

UNITED STATES PATENTS

| | | | |
|---|---|---|---|
| 3,099,666 | 7/1963 | Gorsich | 23—14 |
| 3,166,378 | 1/1965 | Knoth | 260—439 |

OTHER REFERENCES

Topchiev et al.: "Boron Fluoride and Its Compounds as Catalysts in Organic Chemistry," vol. 2, Pergamon Press, New York, 1959, page 100.

OSCAR R. VERTIZ, *Primary Examiner.*

H. S. MILLER, *Assistant Examiner.*